Nov. 8, 1960   F. F. VOLHARD   2,959,069
WEED GUARD
Filed Dec. 24, 1957
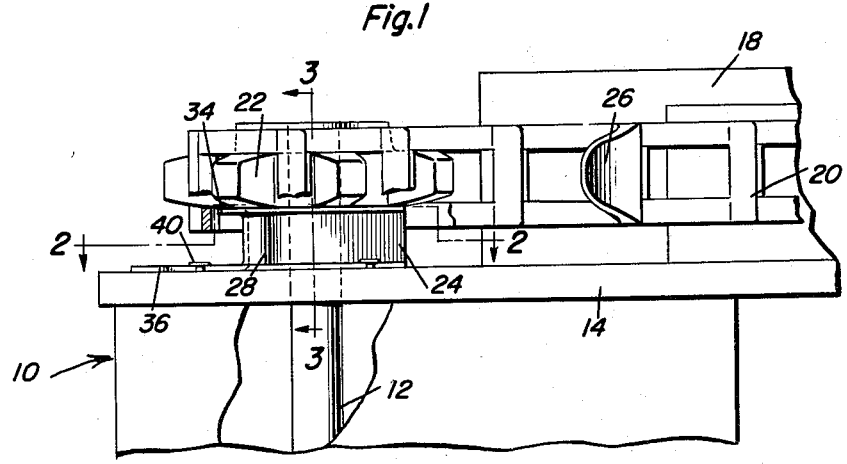
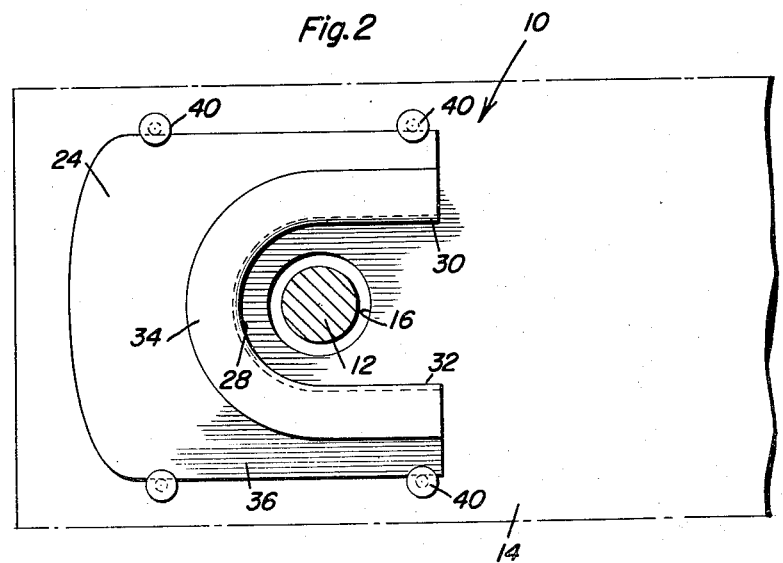
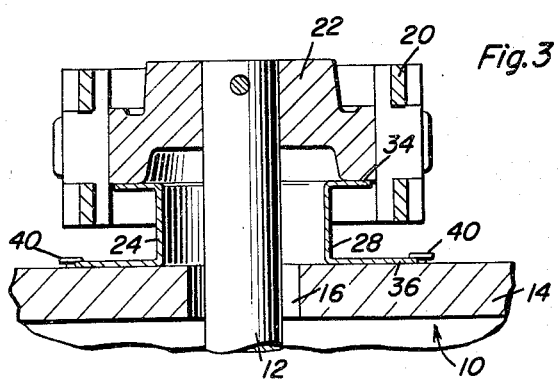
Ferdinand F. Volhard
INVENTOR.

2,959,069

WEED GUARD

Ferdinand F. Volhard, Rte. 1, Marathon, Wis.

Filed Dec. 24, 1957, Ser. No. 705,010

2 Claims. (Cl. 74—611)

This invention relates to a weed guard and more particularly to a weed guard which is adapted to be applied to a farm machine which uses a rotating shaft around which weeds are likely to wind.

An object of the present invention is to provide an attachment for a farm machine, for example a corn chopper, which causes the machine to operate more efficiently in that the weed guard completely eliminates the annoying problem occasioned by weeds that wind around the shaft located adjacent to the ground. My invention eliminates the necessity of repeatedly stopping the corn chopper in order to remove the weeds which have wound around the drive shaft and which prevent the efficient operation of the corn chopper and cause damage to it. As is understood, a collateral advantage of my invention is found in the fuel economy necessarily resulting from less stopping and less drag from the weeds wound around the shaft.

The invention is embodied in a guard which occupies the space between the sprocket of a corn chopper and the board through which the shaft passes in reaching the sprocket. The accumulation of weeds, grass, etc. around the shaft at this location is a source of great annoyance to the farmer in using a corn chopper or any other implement or farm machine which necessarily has a shaft located low on the machine, for example to receive a cutter chain, endless conveyor, etc.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top view of a corn chopper with a guard of my invention applied thereon.

Figure 2 is a sectional view taken on the line 2—2 of Figure 1.

Figure 3 is a sectional view taken on the line 3—3 of Figure 1.

In the accompanying drawing there is shown a corn chopper 10 which schematically represents any type of farm machine which has a low mounted shaft 12 that would be likely to accumulate a quantity of weeds by having them wound around the shaft as the machine is propelled through the field. Typical machine, that is corn chopper 10, has a side board 14 with an opening 16 through which shaft 12 passes. Chain guard 18 is located below flexible chain 20 and on the outside of board 14. Sprocket 22, is pinned or otherwise attached to the end of shaft 12, and together with chain 20 guard 18 and board 14 are conventional equipment and will vary somewhat in design from one manufacturer's make of machine to the next and between the type of machines with which my guard 24 is used.

Guard 24 is located between the inner face of sprocket 22 and the outer surface of the board or wall 14. The guard is mounted near the flexible endless chain 20 but is sufficiently remote from the teeth 26 thereof as to offer no obstruction to the normal and ordinary operation of the corn chopper. The function of the guard is to occupy the space between the inner face of sprocket 22 and the outer surface of wall 14 and prevent weeds from winding on the shaft 12 and perhaps entering the opening 16.

Guard 24 has a lightweight metal or plastic annular wall 28 provided with straight extensions 30 and 32 which open rearwardly of the direction of travel of the corn chopper. An outer flange 34 is fixed to the outer edge of wall 28 and an inner flange 36 is fixed to the inner edge of wall 28. Flange 34 has an outer surface that constitutes a bearing against which the inner face of the sprocket 22 is adapted to ride. The inner surface of flange or mounting plate 36 rests against the outer surface of wall 14 and is held in place by a plurality of fasteners 40. In the illustration the fasteners 40 are nails whose heads partly engage the outer surface of flange 36 and hold it in place. It is specifically understood that the fasteners 40 need not be nails but may be any other type of conventional fastener and the mounting plate 36 may be altered to suit other types of fasteners, for example it may have holes to receive screws.

With the wall 28 made arcuate, my weed guard may be applied to existing equipment without removing the sprocket 22 because it can be slipped over the shaft 12. It is within the purview of my invention to make wall 28 circular with the accompanying disadvantage of more difficult installation.

The foregoing is considered as illustrative only of the principles of the invention. Further, since numerous modifications and changes will readily occur to those skilled in the art, it is not desired to limit the invention to the exact construction and arrangement shown and described, and accordingly, all suitable modifications and equivalents may be resorted to, falling within the scope of the invention as claimed.

What is claimed as new is as follows:

1. In an agricultural implement having a housing provided with an opening, a rotatable shaft mounted in said housing and projecting outwardly through said opening, and a circular drive member secured to said shaft in outwardly spaced relation from said housing, the combination of a weed guard comprising a substantially semi-tubular guard member interposed between said housing and said drive member substantially concentric to said shaft, the axial length of said guard member corresponding substantially to the spacing of the drive member from the housing, said guard member having a inner end edge substantially coplanar with the housing and an outer end edge substantially coplanar with the drive member to prevent weeds from winding around said shaft, said inner end edge comprising a marginal flange for securing the guard member to said housing.

2. The device as defined in claim 1 wherein said outer end edges comprises a marginal flange frictionally engaging said drive member whereby to prevent ingress of weeds between the guard and drive member.

References Cited in the file of this patent

UNITED STATES PATENTS

| 189,235 | Knowlton | Apr. 3, 1877 |
|---|---|---|
| 1,681,141 | Terhune | Apr. 14, 1928 |
| 1,734,051 | Schuler et al. | Nov. 5, 1929 |
| 2,509,436 | Isenbarger | May 30, 1950 |
| 2,688,221 | Giesbrecht | Sept. 7, 1954 |
| 2,718,743 | Smith et al. | Sept. 27, 1955 |
| 2,876,609 | Swanson | Mar. 10, 1959 |

FOREIGN PATENTS

| 544,890 | France | July 6, 1922 |
|---|---|---|
| 263,987 | Great Britain | Jan. 27, 1927 |